(12) United States Patent
Medlin, Sr. et al.

(10) Patent No.: US 6,484,980 B2
(45) Date of Patent: Nov. 26, 2002

(54) FIELD BENDABLE TAB FOR ELECTRICAL BOX SUPPORT

(76) Inventors: Lewis B. Medlin, Sr., P.O. Box 237, Blue Ridge, VA (US) 24054; Lewis B. Medlin, Jr., 1837 Pembrook Dr., Vinton, VA (US) 24179

( * ) Notice: Subject to any disclaimer, the term of this patent is extended or adjusted under 35 U.S.C. 154(b) by 0 days.

(21) Appl. No.: 09/819,538

(22) Filed: Mar. 28, 2001

(65) Prior Publication Data

US 2002/0050547 A1 May 2, 2002

Related U.S. Application Data

(63) Continuation-in-part of application No. 09/621,149, filed on Jul. 21, 2000.

(51) Int. Cl.[7] ................................................. F16L 5/00
(52) U.S. Cl. ....................... 248/205.1; 220/3.5; 248/906
(58) Field of Search ............................... 248/909, 906, 248/205.1, 57; 220/3.7, 3.9

(56) References Cited

U.S. PATENT DOCUMENTS

| 1,506,330 A | | 8/1924 | Vandy |
| 1,789,124 A | | 1/1931 | Wever |
| 1,961,728 A | * | 6/1934 | Arnest et al. ........... 248/906 X |
| 2,233,334 A | | 2/1941 | Austin, Jr. .................. 248/57 |
| 2,788,188 A | | 4/1957 | Smith et al. ................... 248/57 |
| 4,399,922 A | | 8/1983 | Horsley ....................... 220/3.6 |
| 4,483,453 A | | 11/1984 | Smolik ........................ 220/3.5 |
| 4,673,235 A | | 6/1987 | Conley ......................... 439/536 |
| 4,967,990 A | | 11/1990 | Rinderer ................... 248/205.1 |
| 5,209,444 A | | 5/1993 | Rinderer ................... 248/205.1 |
| 5,386,959 A | | 2/1995 | Laughlin et al. ......... 248/205.1 |
| 5,405,111 A | | 4/1995 | Medlin, Jr. ............... 248/205.1 |
| 5,934,631 A | * | 8/1999 | Becker et al. ........... 248/906 X |
| 6,105,918 A | * | 8/2000 | Gromotka ............... 248/906 X |

FOREIGN PATENT DOCUMENTS

JP          53 8676        * 1/1978

* cited by examiner

Primary Examiner—Ramon O. Ramirez
(74) Attorney, Agent, or Firm—Olive & Olive, P.A.

(57) ABSTRACT

An electrical box support is provided having either a single strut accommodating a constant stud spacing or a set of struts telescoping one within the other to accommodate the length for attachment to adjacent studs of different spacings. Each strut has a face suited for mounting an electrical box. An end tab formed at each of outer opposite ends of the support is adapted for bending so as to be able to mount an electrical box appropriately matching the surface of a wall board to be installed. Bending of the tab along a controlled straight line is accomplished by the formation of discontinuous score lines formed along each of several bend lines and which permit, when necessary, the end tab to be straightened and rebent without fracturing the metal forming the end tab.

32 Claims, 4 Drawing Sheets

FIELD BENDABLE TAB FOR ELECTRICAL BOX SUPPORT

RELATION TO CO-PENDING APPLICATION

This application is a continuation-in-part of copending application Ser. No. 09/621,149 filed Jul. 21, 2000 entitled "Adjustable Electrical Box Support."

FIELD OF INVENTION

This invention relates in general to an electrical box support but is more specifically directed to the construction at the outer end of the support of a stud-engaging tab that can be bent in the field to conform to a particular box depth and when necessary, straightened and rebent without fracturing the metal forming the tab.

BACKGROUND OF THE INVENTION

The terms "box" and "electrical box" as used herein are intended to refer to a junction box, receptacle box, switch box, terminal box, connector box or the like as are known in the electrical trade. The term "stud" as used herein is intended to include structural members in a building surface, including wall studs, joists, rafters, etc. The term "wall" as used herein is intended to include ceiling surfaces as well as vertical walls. With these terms in mind, the teachings of the patents described below are given for background and are deemed to be incorporated herein by reference.

U.S. Pat. No. 1,506,330 issued in 1924 recognized the need for an electrical box support capable of accommodating an electrical box of a known depth and studs of different spacing. The '330 patent teaches the practice of forming an electrical box support from a pair of telescoping, channel formed struts, each having a face to which the box could be attached. The '330 patent also teaches bending the ends of the support to form right angled tabs for mounting the box support to and between adjacent studs. The '330 patent box support however required that adjustments for boxes of different depths be made by locating the bent ends of the box support at different locations on the sides of the studs.

U.S. Pat. No. 1,789,124 issued in 1931 also recognized the need for adjusting the length of an electrical box support by bending the ends of the support to accommodate to studs of different spacing. As with the '330 patent box support the '124 patent box support required adjustments for boxes of different depths to be made by locating the bent ends of the box support at different locations on the sides of the stud.

U.S. Pat. No. 2,233,334 issued in 1941 also recognized the need for an electrical box support capable of accommodating electrical boxes of different depth and mounting to studs of different spacing. The '334 patent teaches the practice of forming an electrical box support from a single bar having a face to which the box could be attached. The '334 patent also teaches bending the ends of the support to form right angled tabs for mounting the box support between and to adjacent studs. The electrical box support of the '334 patent however was not adjustable lengthwise and also required that adjustments for boxes of different depths be made by locating the bent ends of the box support at different locations on the sides of the studs.

U.S. Pat. No. 2,788,188 issued in 1957 illustrates in one embodiment an electrical box support constructed of a pair of struts which telescope within each other so as to be able to adjust to different spacings between the studs and providing a face to which the box could be attached. In the mentioned embodiment, the '188 patent also illustrates the practice of prebending the ends of the telescoping struts to form tabs useful for attaching the box support to and between adjacent studs of a known spacing. In another embodiment, the '188 patent illustrates an electrical box support formed from a single flat sheet with bendable tabs at each end. Each tab (described in the patent as the "end of the rod") is described as being provided with equally spaced bend lines (described in the patent as "equally spaced points") with a weakened area which in the '188 patent is described as being a grooved, embossed or etched line along which line the tab can be bent back and forth until the tab breaks off. Thereafter, the next adjacent section to the broken point is bent at right angles to the strut to provide a mounting tab. No details are given in the '188 patent as to how the bend lines would be grooved, embossed or etched. Here it should be recognized that embossing involves forming a protuberance on a surface, etching involves deforming a surface by use of a corrosive and grooving involves cutting into a surface.

The practice of providing a line of holes in an electrical box support to facilitate bending or breaking of the metal along such line, is described in U.S. Pat. No. 4,399,922, issued in 1983, for an electrical outlet box support. The '922 patent illustrates a pair of weakening lines used to facilitate bending for the purpose of breaking off of excess metal. U.S. Pat. No. 4,483,453, issued in 1984, illustrates an electrical box support in which a plurality of parallel lines of holes are used to facilitate bending for the purpose of breaking off of excess metal and U.S. Pat. No. 4,673,235, issued in 1987, also describes an electrical receptacle subplate having two pairs of such bend lines defined by lines of spaced apart holes. The subplate of the '235 plate however unlike the bracket of the present invention, does not accommodate to dimensions which may and typically do vary.

The electrical box support described in U.S. Pat. No. 4,967,990, issued in 1990, comprises a pair of telescoping struts adapted to be mounted between two spaced-apart wall studs. The struts described in the '990 patent have tabs (referred to as "extensions" in the '990 patent) which can be field bent along either of a pair of fold lines defined by spaced apart slots to accommodate electrical boxes of different depth. U.S. Pat. No. 5,209,444 issued in 1993 describes an electrical box support in both telescoping and non-telescoping form in which the tabs are provided with bend lines defined by spaced apart slots similar to those found in the '990 patent. U.S. Pat. No. 5,386,959 issued in 1995 is also noted as teaching use of opposed edge slot notches to establish plural bend lines.

Another practical consideration to be noted is that when brackets are prebent at the place of manufacture and arrive at the job site in a prebent form, the installer may find that the tabs of the bracket have been bent at the wrong location and thus will require straightening and rebending. In other situations, the installer may find that he has an excess quantity of brackets prebent for one job site but which are not suitable for the next job site. In still other situations, the customer may change his requirement, e.g. he may need a 2⅛ inch outlet box at a particular job site instead of a 1½ inch outlet box. These situations thus further illustrate the need for a tab construction which can be straightened and rebent when necessary without fracturing the metal forming the tab.

To complete the foregoing background description it should be recognized that when tabs are bent in the field, it is sometimes necessary after the tab has been bent once along one bend line to straighten and rebend the tab along another bend line better suited to the depth of the box being mounted. For example, the stud to which the tab is being attached may be found to be distorted or the installer may misjudge or initially select the wrong depth of box. In this regard, applicant's prior U.S. Pat. No. 5,405,111, issued in 1995 teaches in a further example the practice of flattening a previously pre-bent tab and rebending the tab to accommodate a different box depth but without relying on any kind of weakening along the bend lines. Therefore, because of the foregoing described and other situations experienced in the field, it is desirable that the tab be relatively easy to bend to accommodate a particular depth of box but not break apart when straightened after being bent and rebent. However, when a bend line is defined by a grooved, embossed or etched line formed so as to intentionally facilitate breaking of the metal as in the '188 patent referred to above, by a set of holes as in the '453 patent referred to above or by a set of spaced apart slots as in the '990 patent referred to above, bending and straightening of the tab even once after the tab has been bent may and often does result in significant weakening or breaking of the metal forming the particular tab which renders useless the strut of which the tab is a part.

The use of slotted holes along the bend lines has not worked satisfactorily when trying to bend the tabs so as to correspond with a particular desired location. In the manufacturing process, it is known that the narrower the cutting blade of a punch, the more apt the punch will be subject to failure i.e. breaking or chipping. For this reason, the type bracket using slotted holes along the bend lines may typically have, for example, 1⅛ inch wide by ¾ inch length slotted hole for each bend line in the tab. Though harder to bend, this type tab construction for a tab typically 1½ inches in width leaves ample steel along the bend line for strong support of the mounted tab. One can also bend and rebend the tab on the bend line without weakening or breaking the tab off. The practical disadvantage of the ⅛ inch wide single slotted hole is that bending the tab creates a large radius bend that originates somewhere within the ⅛ inch wide opening. In other words, the tab length can vary up to ⅛ inch. This could be significant, for if the tab is too short, the outlet box mounted on the bracket of which the tab is a part may break out or bow the sheetrock. On the other hand, if the tab is too long, the user of the bracket may have to purchase longer screws in order to be able to mount one or more electrical devices (i.e. switches, plugs, etc.) to an outlet box.

Another practical consideration arises from the fact that when a tab formed with a single slotted punched opening is bent, the center point of the bend at the bottom of the punched opening may reside on the left side of the tab, whereas the center point of the bend at the top of the punched opening may reside on the right side of the tab (or vice versa). This situation thus may cause one side of the tab to be too long, and the other side of the same tab to be too short. In such circumstances, when the bar bracket is secured to the metal studs, the outlet box will typically not lie in a plane that is parallel to the installed sheetrock. Also to be observed is that one tab may be too long and one tab too short on the same bracket. Also to be noted is that when the tab on the bracket is typically 1½ inch wide and contains a single slotted punched hole ¾ inch in length, there is only ¾ inch of steel supporting the bracket at each bend point.

U.S. Pat. Nos. 4,967,990 and 5,209,444 teach other tab constructions in an attempt to compensate for the tab being hard to bend. These patents teach the use of two relatively long slots for each bend line and which effectively remove material at each bend line and make the tabs easier to bend. The problem encountered with this type of slot construction however is that bending and rebending of the tabs at the same bend line may and typically does result in a weakening of the slotted steel. Thus, the tab may break or fail at a future time once installed. When a pair of slots are used to facilitate bending along a bend line, it has also been found that the center line of the bending point can vary from one slot to the next on the same tab. This variation of the center line of the bending point may be as much as ⅛ of an inch and which can make one tab too long and the other tab too short or angle the mounting flange of the tab. Thus once secured with fasteners to the metal studs, the outlet box may not rest in a plane parallel to the sheetrock, or the installer may bow or break out the sheetrock. As stated previously, when the two slots are ⅝ inch in length each and the tab for example is 1¼ inches in width, there is only ½ inch of steel supporting the bracket at each bend point.

The use of a series of holes to establish a bend line as in U.S. Pat. No. 4,483,453 or U.S. Pat. No. 4,673,235 has also been found not to work satisfactorily. One would encounter the same limitations as with the bracket construction shown in U.S. Pat. Nos. 4,967,990; 5,209,444; or U.S. Pat. No. 5,386,959, depending on the size of the punched holes and the number of holes used to establish the bend line. The punched hole pattern described in U.S. Pat. No. 4,483,453 (FIG. 3), for example, is intended to break apart with little effort. The punched hole pattern described in U.S. Pat. No. 4,673,235 as another example may create a large radius bend that originates somewhere within the punched hole opening. This may in turn cause the mounting tab to be too long or too short, or angled as discussed previously. Thus, there is a need for an improved tab construction having plural bend lines and which permits the tab to be easily bent in the field to form a relatively sharp bend but which can also be straightened and rebent in the field without breaking the metal when necessary because of having chosen for whatever reason the wrong bend line on which to make the original bend.

From the description given, it can be seen that numerous attempts have been made to find a more satisfactory bend line construction that permits in some cases the tab metal to be broken off and in other cases, permits straightening and rebending without risking breakage of the tab metal. Therefore, the primary object of the invention is to provide a further improved electrical box support with an improved tab construction which can be applied to either a telescoping or non-telescoping type support, can be field bent along a well defined bend line to accommodate boxes of different depths and when necessary, can be straightened and rebent along a different but well defined bend line without risk of breaking the metal forming the tab. As previously expressed in the parent patent application Ser. No. 09/621,149, it is also an object to provide a telescoping type electrical box support which has both an improved tab construction that permits straightening and rebending and a relatively tight but releasably locked engagement between the telescoping struts. Other objects will become apparent as the description proceeds.

SUMMARY OF THE INVENTION

As previously stated, the improved electrical box support tab construction of the present invention is useful for both the telescoping as well as the non-telescoping type electrical box support. The present invention which is primarily directed to an improved tab construction is described by way of example incorporated in the adjustable support construction of the copending parent patent application, Ser. No. 09/621,149 and as comprising in a first embodiment two and in a second embodiment three struts that are assembled in telescoping relation to accommodate different stud spacing. A tab is provided on each of the outer ends of the support. Lines along which the tab can be bent, referred to as bend lines, are defined by two or more discontinuous score lines formed in each bend line and which weaken the metal along the bend line to facilitate bending but permit straightening and rebending of the tab when necessitated by field conditions and without the risk of substantially weakening or breaking the metal forming the tab. The box support assembly of the present invention as with the invention of the parent patent application, Ser. No. 09/621,149 is also illustrated as being formed of outer and inner struts with a series of interengaging detents, i.e. conical or hemispherical shaped depressions, so that the struts can be moved to relative positions in which the outer strut detents engage and nest into opposed inner strut detents to releasably lock the struts together at some selected length.

DESCRIPTION OF THE PREFERRED EMBODIMENTS

Figure 1A:
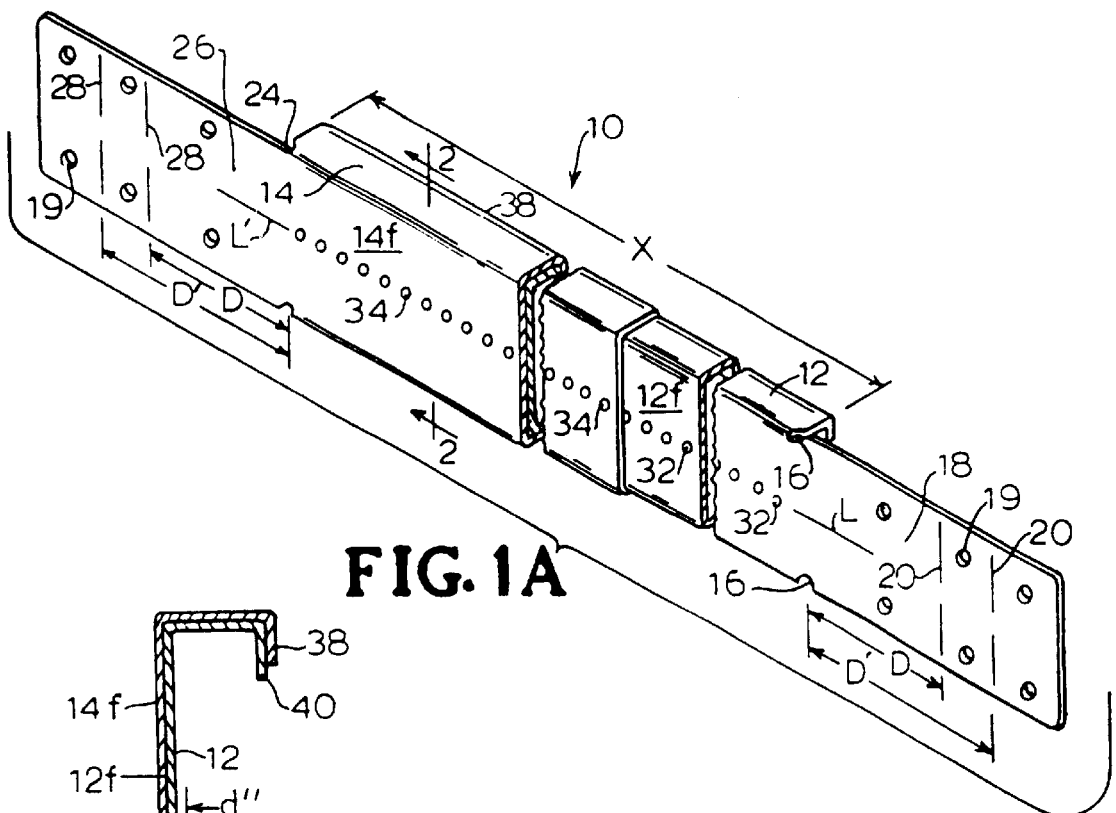
FIG. 1A is a perspective illustration of a first embodiment of the adjustable electrical box support of the invention made up of two releasably engaged struts and showing the front surfaces of the end tabs before the end tabs thereof have been bent in the field for attachment to adjacent wall studs and to accommodate to a particular depth of electrical box.

FIGS. 1A–6 and the beginning description to follow referring to FIGS. 1A–6 substantially repeats what is found in the parent application, Ser. No. 09/621,149, the contents of which are deemed incorporated herein by reference. FIGS. 7–12 and the description related to FIGS. 7–12 supplement the description and drawings of the parent patent application Ser. No. 09/621,149 and are more specifically related to the present invention concerned with construction of the bend lines and how the bend lines are formed on the tabs. While applicable to both the non-telescoping as well as the telescoping type of electrical box support, the improved tab bend line construction of the present invention is described in reference to the telescoping type supports of the parent patent application Ser. No. 09/621,149.

In accordance with the objects described above, and in reference to FIG. 1A, adjustable electrical box support 10 is illustrated as comprising inner strut 12 and outer strut 14. Inner strut 12 and outer strut 14 are formed as elongate channels that are sized to telescopically nest. Inner strut 12 slidingly resides within outer strut 14 to allow a user to telescopically adjust the overall support length X shown in FIG. 1A. Struts 12 and 14 of support 10 are preferably formed with a channel-shaped cross section to provide stiffness and maintain secure engagement of the mating struts. Struts 12 and 14 are preferably formed of galvanized sheet steel, as is known in the electrical trade, of appropriate gauge and of channel dimensions to provide sufficiently stiff support for securely mounting one or more electrical boxes or other devices thereon. For example, 24 gauge (0.6 mm; 0.025 inch thick) sheet steel has been found to be a satisfactory material for the support of the invention.

Inner strut 12 terminates with tab 18 that essentially is an extension of web 12f. A pair of minimal notches or cuts 16 are formed on opposite edges of tab 18 at its juncture to the inner strut web 12f to provide stress relief during the cutting and bending operation. A pair of discontinuous score lines 20 are formed in the front surface of tab 18 substantially perpendicular to axis L of inner strut 12 and at selected distances D, D' from notches 16, leaving some additional length of tab 18 extending beyond. As used herein, a discontinuous score line is understood to be formed by a linear series of spaced apart indentations pressed into the metal surface and which tend to make the metal relatively thin where the indentations are made. That is, the indentations only partially penetrate the thickness of the metal but are deep enough to facilitate bending of the metal along the score lines.

Distance D is preferably determined to allow a standard 1½ inches (38 mm) deep electrical box, when mounted to support 10 and extending outwardly therefrom (see FIG. 5), to be flush with the inner surface of a wall subsequently assembled to the wall studs S and S'. Distance D' is located similarly for a standard electrical box that is 2⅛ inches (54 mm) deep. In other words, distance D or distance D' is substantially equal to the depth of the electrical box being mounted.

Outer strut 14 has tab 26 with notches 24, similar to the previously described notches 16, and discontinuous score lines 28 to facilitate bending of tab 26 in right angular relation as described above in relation to tab 18 of inner strut 12. A further discontinuous score line (not shown) comparable to score line 22 in FIG. 1B is formed on the back surface of tab 26.

Figure 1B:
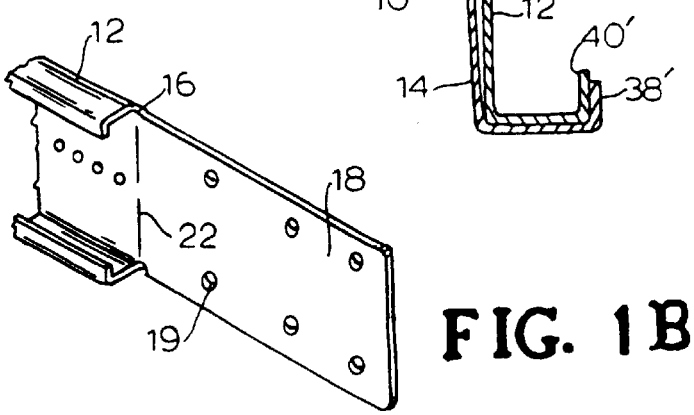
FIG. 1B is a perspective illustration of the rear surface of one end tab of the first embodiment before it has been bent to accommodate a particular depth of electrical box.

FIG. 1B shows a discontinuous score lines 22 formed on the back surface to tab 18 and substantially aligned with notches 16. Positioning discontinuous score line 20 on one surface of tab 18 and discontinuous score line 22 on an opposite surface to tab 18 recognizes that tab 18 is intended to be bent in a direction to open score line 20, 22 for optimum control of bending for straightness, position, and orientation normal to the length of strut 12. It has been discovered that a discontinuous score line made up of a linear series of spaced apart indentations of appropriate depth and length, while providing for a controlled bend in a selected location retains substantial portion of the metal's resiliency to withstand multiple bend cycles without fracture. The depth and length of the segments of the score lines are thus chosen with this object in mind.

Figure 2A:
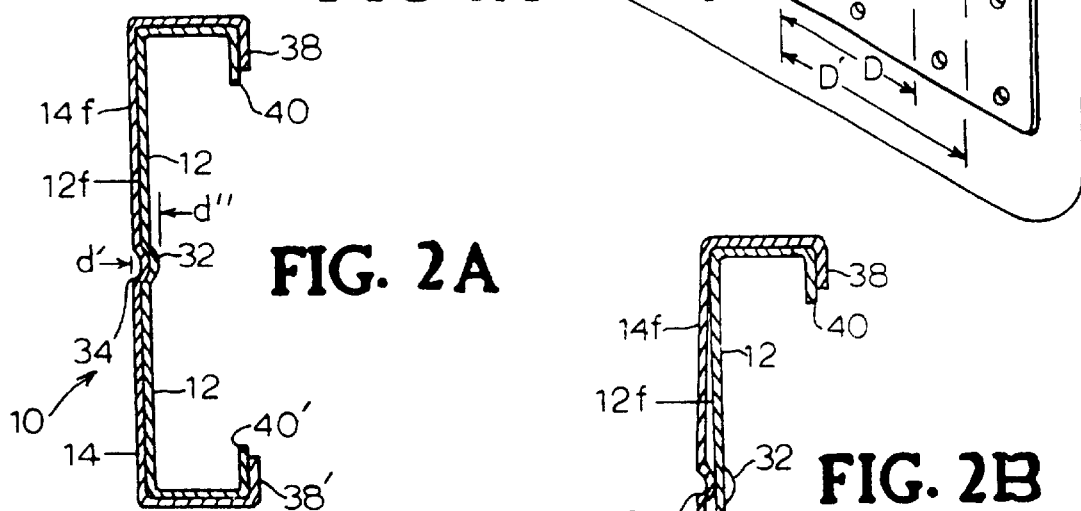
FIG. 2A is a cross sectional view of the adjustable electrical box support of the invention as shown in FIG. 1A and as taken along line 2—2 of FIG. 1A and with the detents engaged.
Figure 2B:
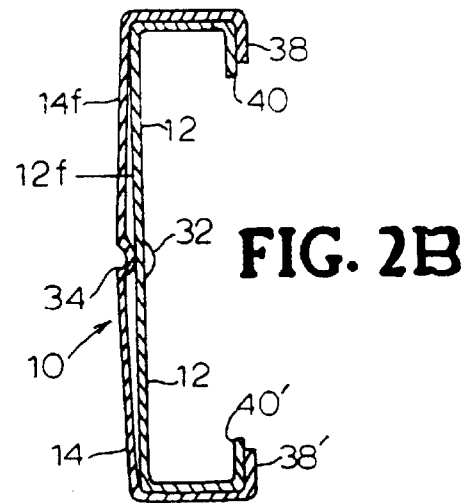
FIG. 2B is a cross sectional view of the adjustable electrical box support of the invention as shown in FIG. 2A but with the struts moved to cause the detents to be disengaged.

As discussed above, while the principle of providing an adjustable length electrical box support has previously been recognized, the prior art adjustable components, with the exception of the prior art support having a frictionally engaged finger discussed in the parent patent application Ser. No. 09/621,149, are relatively loosely fitted together, and can readily fall apart particularly after being assembled and when held in a vertical position. None of the known prior art struts having mating detents which can be releasably locked together. By contrast, in the support made according to the invention of the parent patent application Ser. No. 09/621,149, the telescoping members of support 10 are releasably locked in relation to each other by interengaging detents at some desired overall length X. Length X of support 10, once selected, is releasably locked by a series of detents 32 that are formed in web 12$f$ of inner strut 12 and that can be moved to engage detents 34 that are formed in web 14$f$ of outer strut 14 to releasably lock struts 12 and 14 as depicted in FIG. 2A. Alternatively, struts 12 and 14 can be moved to disengage detents 32 from detents 34 as illustrated in FIG. 2B. Detents 32 are formed as depressions in web 12$f$ of inner strut 12 and effectively appear as dimples. Detents 32 may be round, square, or oval in cross section, for example, resulting in a hemispherical, rounded pyramid, or ellipsoid-shaped indentation. In the preferred embodiment, detents 32 are substantially hemispherical. Detents 32 are formed on inner strut 12 along a substantially straight, centrally located, axis L that is substantially parallel to the length of inner strut 12.

The series of detents 34 are formed on web 14$f$ of outer strut 14 in the manner described above with reference to detents 32 and reside along a central axis L' which resides parallel to axis L of inner strut 12 when inner and outer struts 12 and 14 are assembled in sliding and releasably locked relation to each other as for example in FIG. 1A. Detents 32 of inner strut 12 are preferably made slightly larger in diameter and depth than detents 34 of outer strut 14, to nest snugly together. Detents 32, 34 are positioned equidistant from each other along inner and outer struts 12 and 14 so that multiple detents when in the releasably locked position of FIG. 2A nest simultaneously to obtain maximum engagement and security in maintaining the selected length X of support 10. However, when length adjustments are necessary, the detents can be disengaged as in FIG. 2B and the struts moved in the appropriate direction during which detents 34 of strut 14 slide on the surface 12($f$) of strut 12. As will be understood by those skilled in the art, detents 32 and 34 are fundamentally a linear series of protrusions formed on a surface of a first strut that are oriented to nest into a mating linear series of depressions in a second strut when the first and second struts are releasably locked together.

In the interest of improving the efficiency of field installation, end tabs 18, 26 may be preformed (not shown) at a right angle to the length of electrical box support 10 at the factory and shipped in this form. When this is done, the installer only has to make a single bend at each end, cutting the required number of bends for this field-bending operation in half.

Referring now to FIGS. 2A and 2B, the releasable engagement and disengagement of inner strut 12 and outer strut 14 is illustrated, especially with respect to detents 32 and 34. The channel shape of struts 12 and 14, when assembled into a telescoping bar, has outer rims 38, 38' on strut 14 that wrap substantially around inner rims 40, 40' on strut 12 to keep the two channels engaged. When so engaged as in FIG. 2A, outer detent 34, formed in outer strut 14 is pressed into inner detent 32 of inner strut 12. Outer detent 34 is formed with depth d', as measured from the front face of web 14$f$ to the bottom apex of detent 34. Inner detent 32 has a depth d", as measured from the back surface of web 12$f$ to the bottom apex of detent 32. Inner detent 32 and outer detent 34 are preferably formed with the radius and depth of outer detent 34 being incrementally less than the depth of inner detent 32 to facilitate nesting together. Rims 38, 40, 38', and 40' keep struts 12 and 14 from separating and keep detents 32 and 34 in firm contact. When so engaged, detents 32 and 34 securely maintain the relative positions of struts 12 and 14 and hold the selected length X (see FIG. 1A) of electrical box support 10. Length X is adjusted to equal the distance between two adjacent wall studs in a wall construction of a building, e.g. 36.8 cm (14.5 inches). When it is necessary to extend or compress the working length X of electrical box support 10, the user pulls apart or pushes together outer strut 14 and inner strut 12 which causes each outer strut detent 34 to move out of the corresponding inner strut detent 32 as in FIG. 2B and slide over the planar portion 12$f$ of inner strut 12 between adjacent detents 32 and settle into the next inner strut detent 32 once other detents 32, 34 become aligned and when the desired length X has been obtained.

It should of course be understood that the struts 12 and 14 are formed to permit a snug sliding fit when the detents are disengaged so as to permit the surfaces 14$f$ and 12$f$ to slightly bend to permit the detents 34 to slide on surface 12$f$ when being moved.

Figure 3:
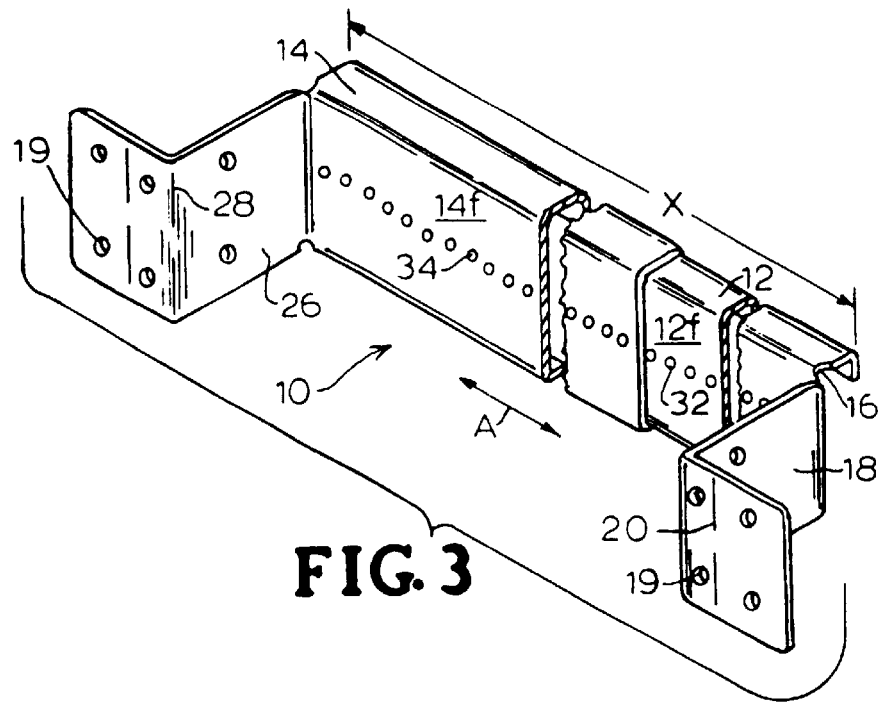
FIG. 3 is a perspective illustration of the adjustable electrical box support of the invention as shown in FIG. 1A after the end tabs thereof have been bent to accommodate a particular depth of box and in a form suitable to being attached to a pair of spaced apart wall studs.

FIG. 3 shows support 10 after tab 18 and tab 26 have each been bent to form a pair of sequential right angles for installation between a pair of adjacent studs. According to the present invention, tab 18, by way of example, is bent at score line 22 (FIG. 1B) in a first bend direction and at one of score lines 20 in a second bend direction. After bending tabs 18 and 26, the assembled inner strut 12 and outer strut 14 are telescoped to adjust length X of support 10 in the direction shown by arrow A to fit the stud separation distance required. Because of the snug nesting of inner strut 12 in outer strut 14, if the distance between a pair of adjacent wall studs were such that detents 32 and 34 did not engage one another, the pressure and frictional engagement of outer detents 34 against web 12$f$ would, nonetheless, prevent unwanted sliding. In this manner, struts 12 and 14 would not tend to separate accidentally and particularly when held vertically by the installer of the support.

Figure 4:
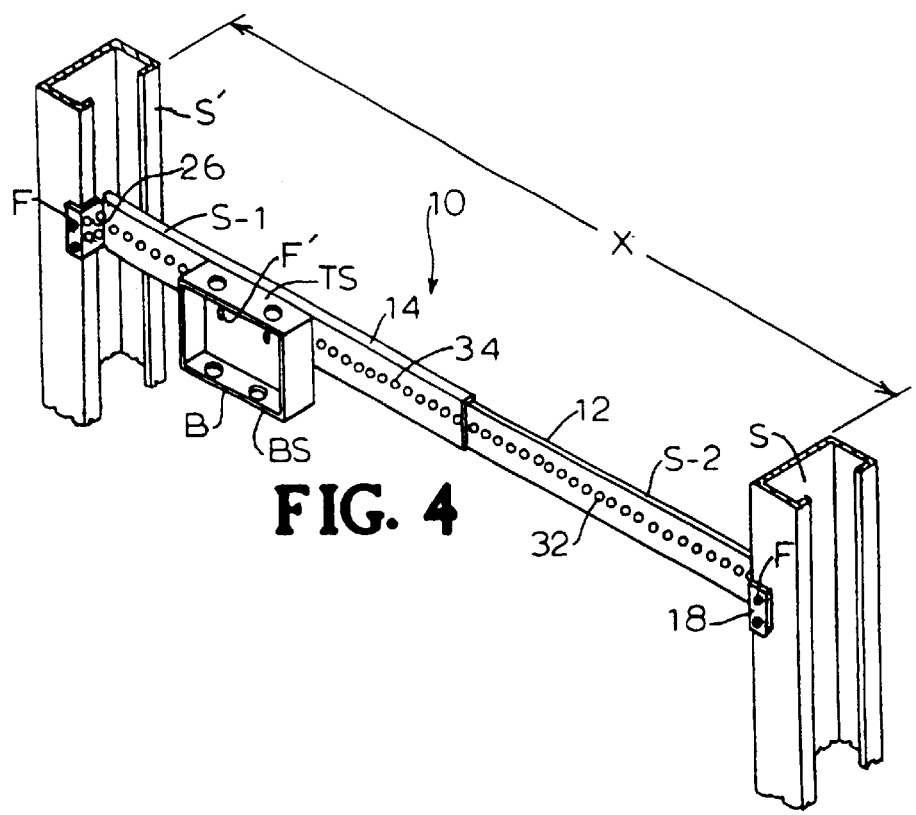
FIG. 4 is a perspective illustration of the adjustable electrical box support of the invention as shown in FIG. 1A after being attached to a pair of adjacent wall studs with an electrical box of a particular depth mounted thereto.

Referring now to FIG. 4, electrical box support 10 is shown after it has been adjusted in length and fixedly attached to adjacent studs S and S' with detents 32 and 34 releasably locking the support length X during attachment. As noted above, length X of support 10, when assembled, is substantially equal to the spacing between adjacent studs S, S'. Tabs 18 and 26 may be pre-punched with holes 19 to accept fasteners (as illustrated in FIGS. 1A and 3) or the needed holes may be formed during installation. Fasteners F for attaching electrical box support 10 to studs S and S' may be of any convenient type, e.g. self-drilling sheet-metal screws. Fasteners F may be installed into the front or side face of studs S and S'. Next, electrical box B is mounted to support 10 in a selected position therealong. Since the holes formed in standard electrical boxes are spaced from one another at known distances, by forming detents 32 and 34 at appropriate intervals, the fasteners passed through the box holes will find the detents. An interval between adjacent detents that is appropriate to match the holes in commercial electrical boxes is 6 mm (¼ inch). A plurality of fasteners F' are inserted through appropriate holes that are pre-formed in the base plate of electrical box B to nest respectively into detents 32 or 34. As will be understood, the alignment of the holes in electrical box B with detents 34 assures that electrical box B will be mounted with its top and bottom surfaces TS and BS (FIG. 4) parallel to surfaces S-1 and S-2 of electrical box support 10. According to the teaching in applicant's prior U.S. Pat. No. 5,405,111, engagement of screw fasteners through a formed detent improves the connective security.

Figure 5:
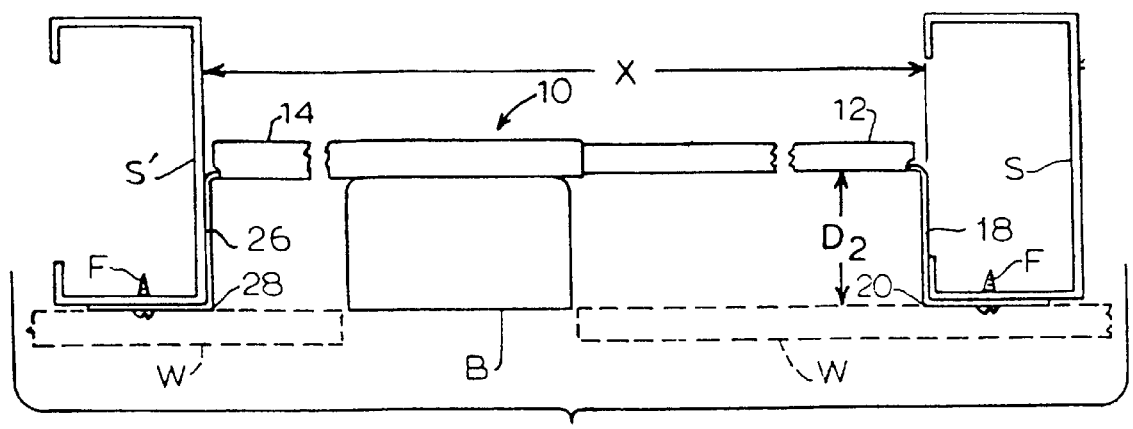
FIG. 5 is a top plan view of the adjustable electrical box support of the invention as shown in FIG. 4 mounted to a pair of adjacent wall studs and with an electrical box of particular depth mounted and with a sheetrock wall shown in dashed lines.

FIG. 5 is a plan view of the adjustable electrical box support 10 of the invention, with end tab 18 and end tab 26 bent to engage adjacent wall studs S and S'. The length X of support 10 is adjusted to fill the space between studs S and S', with tabs 18 and 26 bent respectively at discontinuous score lines 20 and 28 formed according to the present invention. In this configuration, support 10 mounts to studs S and S' at a depth $D_2$ so that the outer edge of electrical box B will be substantially flush with an inner surface of a wall board W (shown in dashed lines) when mounted thereto.

Figure 6:
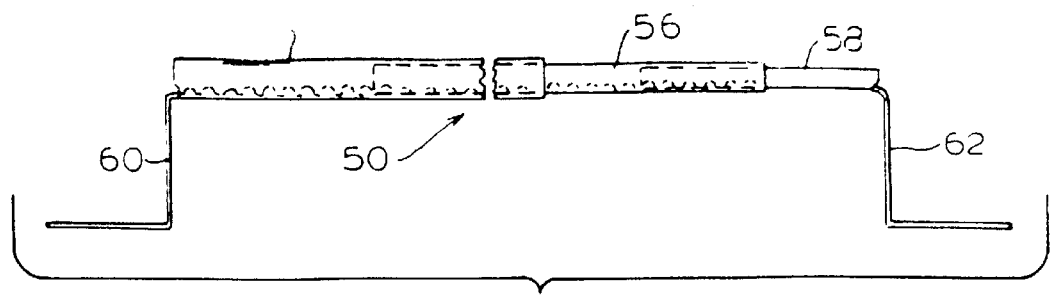
FIG. 6 is a top plan view of a second embodiment of the adjustable electrical box support of the invention made up of three releasably locking struts and showing the end tabs thereof bent prior to being shipped.

FIG. 6 illustrates a further embodiment of the present invention in which electrical box support 50 comprises an assembly having three telescoping channel-shaped components, outer strut 54, middle strut 56, and inner strut 58. Inner strut 58 fits slidingly within middle strut 56 which fits slidingly within outer strut 54. Middle strut 56 is a channel without end tabs and with a series of detents along substantially its entire length and formed in the manner previously explained. Outer strut 54 has end tab 60, and inner strut 58 has end tab 62. This further embodiment functions similarly to the embodiment shown in FIGS. 1–5 and permits a greater range of length adjustability. For example, with two struts (according to the first preferred embodiment) of 25 cm (12 inches) length each, the overall span could be adjusted from a minimum of 25 cm (12 inches) to a maximum of 45 cm (17.7 inches); with three 25 cm (12 inches) long struts, an overall span of from 25 cm (12 inches) to 65 cm (25.6 inches) is possible. It is further recognized that with three struts slideably engaged, it is not possible to predict where the middle strut resides. Thus, in order to prevent middle strut 56 from becoming disengaged from one of the outer struts 54 or 58, a stop (not shown) is provided in the nested channels to prevent this from happening.

Mention has previously been made concerning the need for being able to bend each tab at the outer ends of a strut along either of several bend lines to accommodate to electrical boxes of different depths. It has also been mentioned that field conditions often require that a particular tab which has been bent along one bend line be straightened and rebent along a different bend line because of misjudging the depth of the box being mounted or, for example, encountering a distorted stud mounting surface which is better suited to the tab being bent along a different bend line. In any event, there has been a long-felt need for a tab construction which as previously mentioned permits bending on any of several bend lines and when necessary, straightening and rebending of the tab on a different bend line.

To supplement what has been previously stated with regard to the discontinuous score lines 20 (FIG. 1A), it has been found through further experimentation that when the strut 12 is made of 24 gauge sheet steel (0.6 mm; 0.025 inch thick) and the tabs, i.e. tab 18 and 26, are 1¾ inches in width and score lines 20, 28 are each made up of a pair of discontinuous score lines 7/16 inch in length and 0.018 inch in depth, tabs 18, 26 can be repeatedly straightened and rebent, typically up to about ten times before the tab metal tends to break. This is of course an extremely important advantage in the field where it is often necessary for reasons previously described to straighten and rebend a tab after having been bent on a different bend line. Such bending, straightening, and rebending may in fact have to be repeated several times because of particular field conditions. On the other hand, it has been discovered that if the score lines are continuous rather than discontinuous, the tab metal is very apt to break when the tab is straightened and rebent after being bent on a first bend line. This same tendency for the tab metal to break when the tab is straightened and rebent has also been found to be characteristic of tabs in which the bend lines are defined by spaced apart holes or slots as found in the previously referenced prior art patents. Another advantage to be found when score lines 20, 28 are formed as discontinuous score lines in the manner described is that when bent and even after being straightened and rebent the tab score lines of the invention permit the tab to have a so called square bend, i.e. a relatively sharp 90° angle. In this regard it will be noted that the score lines are preferably formed on the tab surface which will be on the outside of the bend as for example with score lines 28 in FIG. 3.

Figure 7:
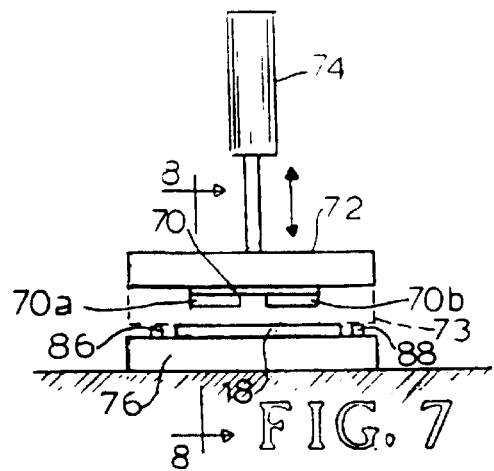
FIG. 7 is a schematic diagram illustrating how score lines coinciding with the bend lines are formed and showing in dashed lines the score line forming die at its lowermost position.
Figure 8:
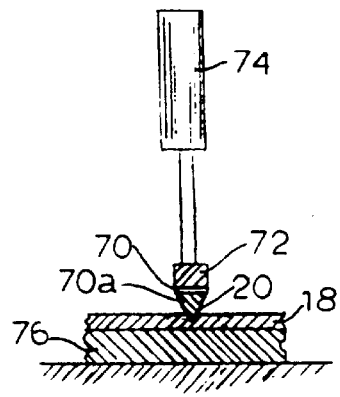
FIG. 8 is a section view taken in the direction of line 8—8 of FIG. 7.

FIGS. 7 and 8 schematically illustrate side and end views of a die assembly for forming discontinuous score lines, e.g. score lines 20, in which there is shown a male die 70 mounted on the bottom surface of press support 72 and actuated by a press drive 74. Die 70 is formed with a pair of precision formed V-shaped die protrusions or sections 70a, 70b which form the score lines, e.g. score lines 20, when die 70 is pressed against the tab 18 or 26 (FIG. 1A) residing on flat base 76 formed of hardened steel and with the depth of the press stroke, indicated by dash line 73 being limited by precision stops 86, 88 which precisely limit the travel of male die 70 so as to precisely form the discontinuous score lines, e.g. score lines 20 or 28.

Figure 9:
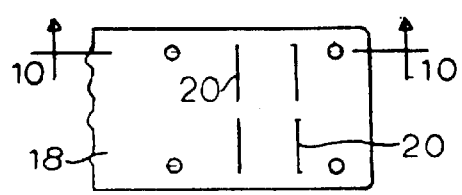
FIG. 9 is an enlarged plan view of a section of tab 18 showing score lines 20.
Figure 10:
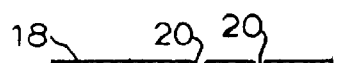
FIG. 10 is a an enlarged section view taken in the direction of line 10—10 of FIG. 9.
Figure 11:
FIG. 11 enlarged end view of one of the male die sections.
Figure 12:
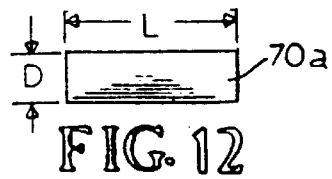
FIG. 12 is an enlarged side view of one of the male die sections.

FIGS. 9 and 10 further illustrate the relatively shallow but particularly important depth of the score lines. The depth D (FIG. 11) of the die section (e.g. protrusion 70a) is precision formed and in conjunction with angle X (FIG. 11) and length L (FIG. 12) control the geometry of the score line. In this regard, it has been found that when the tab is formed of 1.750 inch wide, 24 gauge steel, angle X should preferably be in the range of 30 to 45 degrees, length L should be in the range of 0.50 to 0.75 inches and depth D should be in the range of 0.006 to 0.025 inches. Within these ranges the tab preserves the ability to be repeatedly bent without breakage, forms an acceptable sharp angle when bent and such die dimensions will not cause excessive loading of the press.

In summary, the following are the main advantages of the discontinuous score line tab construction of the invention:

1. Tabs can be bent, straightened and rebent without the risk of breaking or weakening the metal forming the tab.
2. The discontinuous score line provides a precise point of bend that ensures the outlet box (once installed) will rest in a plane parallel to the sheetrock.
3. There is a minimum radius at the point of the bend allowing the tabs to nest snugly against the metal studs.
4. The center line of the bend is always substantially at the center of the discontinuous score line.
5. The mounting tabs will always be the same length, as there is no variation in the bend line.
6. With the discontinuous score line, metal does not have to be removed to establish the point of bend.
7. Maximum strength and rigidity to the bracket's mounting tabs is achieved while retaining a substantial portion of the metal's resiliency to withstand multiple bend cycles without fractures.
8. The die used to form the score lines even after repeated use is not subject to chipping or damage.
9. An improved electrical box support can now be provided which combines and incorporates in the same support both the improved tab construction of the present invention which permits the tab to be straightened and rebent when necessary to fit the requirements of the job site as well as the improved interlocking feature of the prior invention set forth in the parent copending patent application Ser. No. 09/621,149 which readily permits the length of the support to also be adjusted to fit the job site.
10. The discontinuous score lines of the invention can be formed without requiring cutting into, etching or embossing the surface of the sheet metal forming the tab.

The above detailed description of preferred embodiments of the invention sets forth the best mode contemplated by the inventor for carrying out the invention at the time of filing this application and is provided by way of example and not as a limitation. Accordingly, variuos modifications and variations obvious to a person of ordinary skill in the art to which it pertains are deemed to lie within the scope and spirit of the invention as set forth in the following claims.

What is claimed is:

1. In an electrical box support formed of sheet metal and adapted to extend between a pair of wall studs and support an electrical box, said electrical box support having on each of opposite ends a tab adapted for being attached to a respective one of said studs, each said tab comprising:
   (a) a solid planar metal sheet integral with and extending outwardly of said support;
   (b) at least one transverse bend line formed on said solid planar metal sheet and along which said tab can be field bent; and
   (c) coinciding with and defining each said bend line at least one discontinuous score line pressed for its entire length into said solid planar metal sheet and along which said solid planar metal sheet is weakened to enable said tab to be field bent along said bend line and when necessary after being bent to be straightened and rebent without fracturing the metal comprising said tab and wherein each said score line is formed as a V-shaped depression.

2. In an electrical box support as claimed in claim 1 having a plurality of said transverse bend lines formed on said sheet in longitudinally spaced parallel relation and wherein said plural longitudinally spaced parallel bend lines comprise two bend lines.

3. In an electrical box support as claimed in claim 1 wherein said score line defining each said bend line comprises two score lines in discontinuous relation.

4. In an electrical box support as claimed in claim 1 wherein said support comprises first and second elongate members telescopically assembled to one another and each said tab comprises a tab mounted at an outer end of one of said members.

5. In an electrical box support as claimed in claim 4 including plural cooperating locking means formed at a linearly spaced series of locking positions on each of said members and adapted when moved linearly in conjunction with manual adjustment of the telescoping relation of said members to bring the locking means of the first member in releasable engagement with the locking means of the second member at a selected cooperative locking position whereby to establish and maintain said support in a manually releasable said selected length.

6. An adjustable electrical box support as claimed in claim 5, wherein said plural cooperating locking means comprises a series of interengagable detents formed along a lengthwise extending axis of each of said elongate members.

7. An adjustable electrical box support as claimed in claim 6, wherein the detents formed on said first elongate member are deeper than the detents formed on said second elongate member.

8. An adjustable electrical box support as claimed in claim 6, wherein said detents are spaced apart from each other along said axis of each of said members by a distance selected such that individual fasteners passed through mounting holes in a plate of an electrical box mounted on said support are able to each engage a detent.

9. In an electrical box support as claimed in claim 1 wherein dependent on the width and thickness of said metal sheet, the length, depth and individual angle of said score lines are selected such that said tab can be bent, straightened, and rebent without fracturing said metal.

10. In an electrical box support formed of sheet metal and adapted to extend between a pair of wall studs and support an electrical box, said electrical box support having on each of opposite ends a tab adapted for being attached to a respective one of said studs, each said tab comprising:
   (a) a solid planar metal sheet integral with and extending outwardly of said support;
   (b) at least one transverse bend line formed on said solid planar metal sheet and along which said tab can be field bent;
   (c) coinciding with and defining each said bend line at least one discontinuous score line pressed for its entire length into and along which said solid planar metal sheet is weakened to enable said tab to be field bent along said bend line and when necessary after being bent to be straightened and rebent without fracturing said metal comprising said tab; and
   (d) wherein each said score line is formed as a V-shaped depression.

11. An adjustable electrical box support, comprising:
   (a) a first elongate member having a first end tab formed of planar solid metal sheet integral with and extending outwardly of said first elongate member and adapted for being attached to a first stud in a building wall;
   (b) a second elongate member having a second end tab formed of planar solid metal sheet integral with and extending outwardly of said first elongate member and adapted for being attached to a second stud that is substantially parallel to and spaced apart from said first stud in said building wall with said second elongate member telescopically assembled to said first member so as to establish said support with a selected length substantially equal to the spacing between said studs;

(c) at least one transverse bend line formed on said planar solid metal sheet forming each said tab and along which said tab can be field bent; and (d) coinciding with and defining each said bend line at least one discontinuous score line pressed for its entire length into and along which said planar solid metal sheet is weakened to enable said tab to be field bent along said bend line and when necessary after being bent to be straightened and rebent without fracturing the metal comprising said tab and wherein each said score line is formed as a V-shaped depression.

12. An adjustable electrical box support as claimed in claim 11, wherein said support includes plural cooperating locking means formed at a linearly spaced series of locking positions on each of said members and adapted when moved linearly in conjunction with manual adjustment of the telescoping relation of said members to bring the locking means of the first member in releasable engagement with the locking means of the second member at a selected cooperative locking position whereby to establish and maintain said support in a manually releasable said selected length.

13. An adjustable electrical box support as claimed in claim 12, wherein said plural cooperating locking means comprises a series of interengagable detents formed along a lengthwise extending axis of each of said elongate members.

14. An adjustable electrical box support as claimed in claim 13, wherein the detents formed on said first elongate member are deeper than the detents formed on said second elongate member.

15. An adjustable electrical box support as claimed in claim 13, wherein said detents are spaced apart from each other along said axis of each of said members by a distance selected such that individual fasteners passed through mounting holes in a base plate of an electrical box mounted on said support are able to each engage a detent.

16. In an electrical box support as claimed in claim 11 wherein dependent on the width and thickness of said metal sheet, the length, depth and individual angle of each said score line are selected such that said tab can be bent, straightened, and rebent without fracturing said metal.

17. In an electrical box support as claimed in claim 11 having a plurality of said transverse bend lines formed on each said sheet in longitudinally spaced parallel relation and wherein said plural longitudinally spaced parallel bend lines comprise two bend lines.

18. In an electrical box support as claimed in claim 11 wherein said discontinuous score line comprises two discontinuous score lines.

19. An adjustable electrical box support, comprising:

(a) a first elongate member having a first end tab formed of solid planar metal sheet integral with and extending outwardly of said first elongate member and adapted for being attached to a first stud in a building wall;

(b) a second elongate member having a second end tab formed of solid planar metal sheet integral with and extending outwardly of said first elongate member and adapted for being attached to a second stud that is substantially parallel to and spaced apart from said first stud in said building wall with said second elongate member telescopically assembled to said first elongate member so as to establish said support with a selected length substantially equal to the spacing between said studs;

(c) at least one transverse bend line formed on said solid planar metal sheet forming each said tab and along which said tab can be field bent;

(d) coinciding with and defining each said bend line at least one discontinuous score line pressed for its entire length into and along which said solid planar metal sheet is weakened to enable each said tab to be field bent along a said bend line and when necessary after being bent to be straightened and rebent without fracturing the metal comprising said tab; and (e) wherein each said score line is formed as a V-shaped depression.

20. In an electrical box support formed of sheet metal and adapted to extend between a pair of wall studs and support an electrical box, said electrical box support having on each of opposite ends a tab adapted for being attached to a respective one of said studs and wherein said support comprises first and second elongate members telescopically assembled to one another and each said tab comprises a tab mounted at an outer end of one of said members, each said tab comprising:

(a) a solid planar metal sheet integral with and extending outwardly of said support;

(b) at least one transverse bend line formed on said solid planar metal sheet and along which said tab can be field bent;

(c) coinciding with and defining each said bend line at least one discontinuous score line pressed for its entire length into said solid planar metal sheet and along which said solid planar metal sheet is weakened to enable said tab to be field bent along said bend line and when necessary after being bent to be straightened and rebent without fracturing the metal comprising said tab;

(d) said electrical box support including plural cooperating locking means formed at a linearly spaced series of locking positions on each of said members and adapted when moved linearly in conjunction with manual adjustment of the telescoping relation of said members to bring the locking means of the first member in releasable engagement with the locking means of the second member at a selected cooperative locking position whereby to establish and maintain said support in a manually releasable said selected length;

(e) said plural cooperating locking means comprising a series of interengagable detents formed along a lengthwise extending axis of each of said elongate members; and (f) wherein said detents are spaced apart from each other along said axis of each of said members by a distance selected such that individual fasteners passed through mounting holes in a plate of an electrical box mounted on said support are able to each engage a detent.

21. An adjustable electrical box support as claimed in claim 20, wherein said plural cooperating locking means comprises a series of interengagable detents formed along a lengthwise extending axis of each of said elongate members.

22. An adjustable electrical box support as claimed in claim 20, wherein the detents formed on said first elongate member are deeper than the detents formed on said second elongate member.

23. In an electrical box support as claimed in claim 20 having a plurality of said transverse bend lines formed on said sheet in longitudinally spaced parallel relation and wherein said plural longitudinally spaced parallel bend lines comprise two bend lines.

24. In an electrical box support as claimed in claim 20 wherein said score line defining each said bend line comprises two score lines in discontinuous relation.

25. In an electrical box support as claimed in claim 20 wherein each said score line is formed as a V-shaped depression.

26. In an electrical box support as claimed in claim 20 wherein dependent on the width and thickness of said metal sheet, the length, depth and individual angle of said score lines are selected such that said tab can be bent, straightened, and rebent without fracturing said metal.

27. An adjustable electrical box support, comprising:

(a) a first elongate member having a first end tab formed of planar solid metal sheet integral with and extending outwardly of said first elongate member and adapted for being attached to a first stud in a building wall;

(b) a second elongate member having a second end tab formed of planar solid metal sheet integral with and extending outwardly of said first elongate member and adapted for being attached to a second stud that is substantially parallel to and spaced apart from said first stud in said building wall with said second elongate member telescopically assembled to said first member so as to establish said support with a selected length substantially equal to the spacing between said studs;

(c) at least one transverse bend line formed on said planar solid metal sheet forming each said tab and along which said tab can be field bent;

(d) coinciding with and defining each said bend line at least one discontinuous score line pressed for its entire length into and along which said planar solid metal sheet is weakened to enable said tab to be field bent along said bend line and when necessary after being bent to be straightened and rebent without fracturing the metal comprising said tab;

(e) said support includes plural cooperating locking means formed at a linearly spaced series of locking positions on each of said members and adapted when moved linearly in conjunction with manual adjustment of the telescoping relation of said members to bring the locking means of the first member in releasable engagement with the locking means of the second member at a selected cooperative locking position whereby to establish and maintain said support in a manually releasable said selected length;

(f) said plural cooperating locking means comprises a series of interengagable detents formed along a lengthwise extending axis of each of said elongate members; and (g) said detents are spaced apart from each other along said axis of each of said members by a distance selected such that individual fasteners passed through mounting holes in a base plate of an electrical box mounted on said support are able to each engage a detent.

28. In an electrical box support as claimed in claim 27 wherein dependent on the width and thickness of said metal sheet, the length, depth and individual angle of each said score line are selected such that said tab can be bent, straightened, and rebent without fracturing said metal.

29. An adjustable electrical box support as claimed in claim 27, wherein the detents formed on said first elongate member are deeper than the detents formed on said second elongate member.

30. In an electrical box support as claimed claim 27 having a plurality of said transverse bend lines formed on each said sheet in longitudinally spaced parallel relation and wherein said plural longitudinally spaced parallel bend lines comprise two bend lines.

31. In an electrical box support as claimed in claim 27 wherein said discontinuous score line comprises two discontinuous score lines.

32. In an electrical box support as claimed in claims 27 wherein each said score line is formed as a V-shaped depression.

* * * * *

UNITED STATES PATENT AND TRADEMARK OFFICE
CERTIFICATE OF CORRECTION

PATENT NO. : 6,484,980 B2  
DATED : November 26, 2002  
INVENTOR(S) : Medlin et al.

It is certified that error appears in the above-identified patent and that said Letters Patent is hereby corrected as shown below:

Title page,  
Item [76], change "1837 Pembrook Dr.," to -- 1827 Pembrook Dr. --

Column 4,  
Line 13, change "1 1/4" to -- 1 3/4 --

Column 7,  
Line 8, change "to tab 18" to -- of tab 18 --  
Line 27, change "having" to -- have --

Signed and Sealed this

Twenty-fifth Day of February, 2003

JAMES E. ROGAN  
*Director of the United States Patent and Trademark Office*